United States Patent [19]  [11] Patent Number: 4,877,433
Oshitari  [45] Date of Patent: Oct. 31, 1989

[54] HIGH PERFORMANCE GAS FILTER ASSEMBLY

[76] Inventor: Yoshimi Oshitari, 10-8, 1-Chome, Hon-Cho, Tanashi City, Tokyo-To, Japan, 188

[21] Appl. No.: 230,275
[22] Filed: Sep. 26, 1988

Related U.S. Application Data

[63] Continuation of Ser. No. 53,937, May 22, 1988, abandoned.

[30] Foreign Application Priority Data

May 23, 1986 [JP] Japan .................. 61-117497
Jul. 1, 1986 [JP] Japan .................. 61-152642
Jul. 1, 1986 [JP] Japan .................. 61-152643

[51] Int. Cl.⁴ ............................ B01D 50/00
[52] U.S. Cl. ............................ 55/486; 55/487; 55/528
[58] Field of Search ............ 55/97, 486, 487, 524, 55/528

[56] References Cited

U.S. PATENT DOCUMENTS

| 2,826,265 | 3/1958 | De Woody | 55/528 |
| 2,933,154 | 4/1960 | Lauterbach | 55/97 |
| 3,003,643 | 10/1961 | Thomas | 55/487 |
| 3,505,794 | 4/1970 | Nutter et al. | 55/487 |
| 3,675,403 | 7/1972 | Ruffo | 55/524 |
| 4,187,390 | 2/1980 | Gore | 55/486 |
| 4,259,096 | 3/1981 | Nakamura et al. | 55/486 |
| 4,324,574 | 4/1982 | Fagan | 55/524 |
| 4,478,620 | 10/1984 | Tamura | 55/486 |

FOREIGN PATENT DOCUMENTS 2622804 1/1977 Fed. Rep. of Germany ........ 55/487

Primary Examiner—Richard L. Chiesa
Assistant Examiner—C. Scott Bushey

[57] ABSTRACT

The high-performance filter assembly has a filter paper made of synthetic or glass fibers and a fine particle checking member provided on the air outlet surface of the filter paper so as to overlap each other. The fine particle checking member is a thin microporous film preferably comprised of expanded porous PTFE. The assembly also has a breathable reinforcing paper member laminated or bonded to the particle checking number, in which this entity is further bonded or laminated to the air outlet surface of the filter paper.

9 Claims, 3 Drawing Sheets

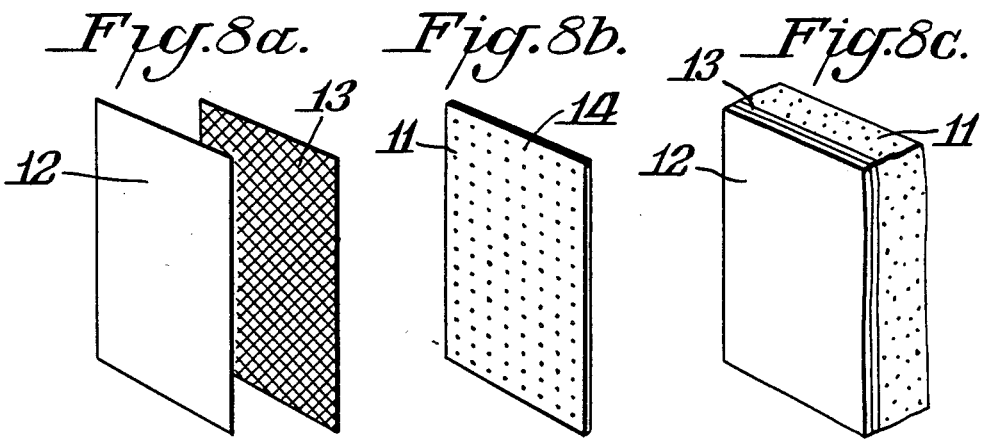
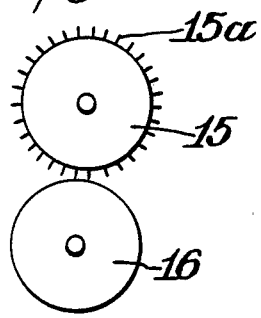
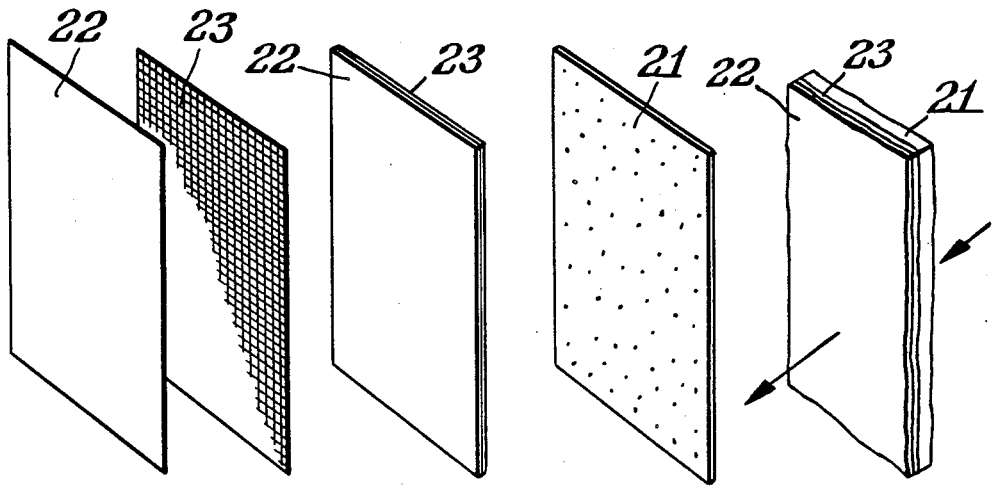

HIGH PERFORMANCE GAS FILTER ASSEMBLY

This application is a continuation of application Ser. No. 053,937, filed May 22, 1988, now abandoned.

BACKGROUND OF THE INVENTION

1. Field of the Invention

The present invention relates to a high-performance gas filter assembly capable of maintaining a working atmosphere of high purity, which is required in the production of electronic devices, thereby contributing to the enhancement of the product quality, and is also capable of checking dust generation from the filter paper used in this environment. 2. Description of the Prior Art In the electronic, precision, and pharmaceutical industries, the manufacture of products in which adhesion of dust exerts a serious influence on the product, requires a dust-free atmosphere of high degree. To meet this demand, filter paper having a high performance such that particles of 0.3 $\mu$ in diameter can be tapped at an efficiency of more than 99.97% has been developed.

However, in manufacture of paper from fine glass fibers or synthetic fibers, which is a technique generally used in the manufacture of high-performance filter paper, the purity of the air is not as high as expected from the performance of the filter paper considered to have caught almost all of the dust. Also, residue such as fibers from the manufacture of the filter paper contaminate the filter paper and thus generate dust when a blast of air or vibration is applied to the filter creating dust downstream of the filter. For this reason, it appears that there is a substantial reduction in trapping efficiency using glass and synthetic fiber filters by themselves.

Filter paper generally has a large thickness (e.g., 400 $\mu$) in order to increase the filtering capacity. From the time in which the filter paper is used it is believed that almost all dust which has flowed into the filter is trapped between the air entrance surface and an area about 200 $\mu$ deep from the entrance surface, as indicated by the dark area in the sectional view of FIG. 1. The air exits through the filter paper, but in actuality, the air has not been purified to the expected purity.

Conventional filter paper is produced by mixing fibers such as glass fibers and synthetic fibers, which have diameters selected in accordance with the required performance, into water with an adhesive resin mixed therein, dehydrating the mixture and drying it. The water and adhesive resin mixture provide strength for the filter paper. With this method, it is impossible to prevent minute waste of fibers from being produced and mixed into the water during the course of production of the fibers. In addition, since a multiplicity of fine particles are contained in the water which is used for paper making, there are multiplicity of fine particles contained on the surface and in the interior of the paper filter which is produced by dehydrating and drying the paper.

It is possible to fix the fine particles contained on the surface and in the interior of the paper filter by means of the adhering action of the adhesive resin which is mixed into the water for the purpose of providing strength to the filter paper. When the amount of adhesive resin is increased so that the adhesive strength and mechanical strength of the bond between fibers is enhanced, the ratio of closing the pores produced between the fibers increases and the pressure drop across the filter also increases. Therefore, the amount of adhesive resin is generally limited to as small a value as about 7% with respect to the weight of filter paper. This value however is insufficient for fixing the total amount of the fine particles to the fiber surface, so that many fine particles are loose in the filter paper. Accordingly, when vibration or shock is applied to the filter paper due to blast or a pulse, the loose fine particles slip off the filter paper, thereby substantially lowering the purity of the air.

TABLE 1

| Particle diameter | Immersion number of times | | |
|---|---|---|---|
| | 1 | 2 | 3 |
| | Counts | | |
| 0.1 to 0.5 | 68 | 100 | 111 |
| 0.5 to 0.75 | 648 | 741 | 763 |
| 0.75 to 1.0 | 67 | 97 | 83 |
| 1.0 to 2.0 | 71 | 74 | 69 |
| 2.0 to 5.0 | 38 | 32 | 44 |
| 5.0 to 10.0 | 28 | 28 | 27 |
| 6.0 to 10 or more | 6 | 5 | 5 |
| Total | 926 | 1077 | 1102 |

Table 1 shows the results of simple experiments for obtaining the content of fine particles in the filter paper. Standard high-performance filters, namely, filter paper made from glass fibers having an average diameter of about 0.4 to 0.7 $\mu$m were tested for particles, a particle having a diameter of 0.3 $\mu$m and a thickness of 0.4 mm, and a quoted trapping efficiency of 99.97%. The test method consisted of cutting the filter paper into sizes of 4 cm$\times$4 cm, and immersing them in 100 cc of pure water three times, for 1 minute immersion and the fine particles found in the pure water were classified by diameter and the number of fine particles were measured (counted) for each classified particle diameter.

As is clear from Table 1, the fine particles contained in the filter paper were not removed by a one-time immersion. There was a tendency for the number of fine particles released from the filter paper to increase with the number of times of immersion, namely, the first immersion totalled 926; the second immersion totalled 1,077, and the third totalled 1,102. For each immersion, the fine particles having a particle diameter of 0.5 to 0.75 $\mu$ were removed in the maximum number. The total number of fine particles released from the filter paper by the three immersions was 3,105. When this is calculated in terms of a standard filter within a frame with the dimensions 610 mm (length) $\times$ 610 mm (width) $\times$ 150 mm (depth) having a total surface area (20 m$^2$) trapping efficiency of 99.97%, the total number of fine particles contained in the filter paper calculated is 3,881$\times$10$^7$. In addition, since not all of the fine particles in the filter paper had escaped even after the three-time immersion, the total number of fine particles contained in the filter paper may be greater than 3,881$\times$10$^7$. Since a small number of these particles are released due to blast or vibration, the overall performance of the filter paper is lowered.

As can be seen from the description above, the object of the invention is to produce a filter without fine particles contained in filter paper in order to improve the performance of conventional filter paper. This is difficult to accomplish. It is more practical to allow fine particles to be contained in filter paper and to prevent them from being released from the filter paper. It is also necessary to prevent the increase in the pressure drop and the lowering of the performance of filter paper due to the presence of the fine particles in the filter paper.

Porous films of synthetic resins with pores having the necessary diameter, and in which the porosity is at a maximum of about 30% are available presently. However, while these porous films may be placed on high-performance filter paper so that they prevent the release of the fine particles contained in the filter paper, they also increase the pressure drop so much they are not suitable to be used with the conventional filter paper.

SUMMARY OF THE INVENTION

In accordance with the present invention, a new and improved filter assembly is provided.

The high-performance filter assembly consists of a filter paper made of synthetic or glass fibers and a fine particle checking member provided on the air outlet surface of the filter paper so as to overlap each other. The fine particle checking member is a thin microporous film preferably comprised of expanded porous PTFE.

In one embodiment, the assembly also has a breathable reinforcing paper member laminated or bonded to the particle checking member, in which this entity is further bonded or laminated to the air outlet surface of the filter paper. In another embodiment, a breathable reticulated fabric member is used with the high performance filter assembly.

BRIEF DESCRIPTION OF THE DRAWINGS

FIGS. 8a–8c show perspective views of one embodiment of the present invention;

FIG. 9 is a partial view of the bonding rolls of the present invention; and

FIGS. 10a–10d show perspective views of another embodiment of the present invention with FIG. 10d including arrows designating the direction of airflow.

DESCRIPTION OF THE PREFERRED EMBODIMENTS

The present invention relates to a high performance filter assembly comprising a filter paper made of glass fibers or other synthetic fibers and a fine particle checking member provided on the air outlet surface of the filter paper so as to overlap with each other. The fine particle checking member is a porous film which is capable of hindering the passing of fine particles contained in the filter paper without greatly raising the pressure loss (drop) and which has a large porosity.

Figure 2:
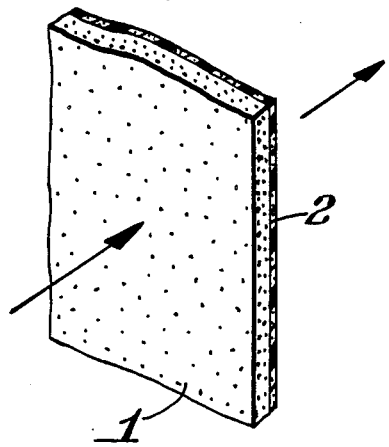
FIG. 2 is a partially perspective view of the structure of the present invention with arrows designating the direction of airflow.

This invention can best be understood by reference to FIG. 2. This is a partial perspective of the invention in which continuous checking member (2) is placed on the air outlet surface (3) of the filter paper (1), so that the entire performance of the high-performance filter paper has a trapping efficiency of 99.97%. Arrows are included to designate the direction of airflow.

A preferred porous material for the checking member of this invention is made from expanded porous polytetrafluoroethylene (PTFE). This material is preferred because it is easy to remove dust therefrom and can satisfactorily attain the control of the release of fine particles contained in the filter paper.

Figure 3:
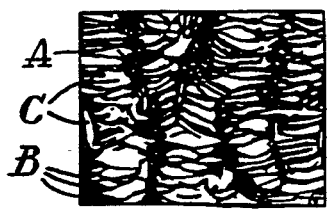
FIG. 3 is a sectional view of a checking member made of a porous film.

Exapnded porous PTFE is described in U.S. Pat. No. 4,187,390 and is commercially available from W. L. Gore and Associates. This material is comprised of a multiplicity of nodes (A), a multiplicity of fibrils (B) connecting nodes (A) and a multiplicity of long and narrow minute void spaces (C) which are surrounded by nodes (A) and the fibrils (B), as shown in the microphotograph FIG. 3. When this material is used in a dust-free room, it is possible to reduce the number of fine particles contained therein to almost zero. Furthermore, it is possible to make pores of 0.02 to 15 μm in diameter and, hence, it is easy to obtain pores having the diameter required as a control member. It is also possible to obtain the porosity in the range of 25 to 95% as desired. Thus, it is preferred to obtain a checking member having a porosity of 95%. Table 2 shows characteristics of expanded porous PTFE.

TABLE 2

| Characteristics | Range |
| --- | --- |
| Pore diameter | Necessary diameter is obtained in the range of 0.02 to 15 |
| Porosity (%) | Necessary porosity is obtained in the range of 25 to 95% |
| Tensile Strength | to 2,800 kg/m$^2$ |
| Heat resistance | −240 to +260 (°C.) |
| Adhesion | Easily adheres without preprocessing |
| Chemical resistance | Free from attack of almost all chemicals |

Figure 4:
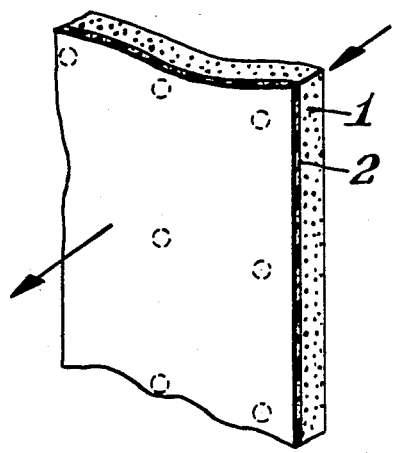
FIG. 4 shows an example of a method of overlapping a checking member of a porous film and filter paper with arrows designating the direction of airflow.

Furthermore, the adhesive properties of expanded porous PTFE enables filter paper having a large area to be laid on top of the expanded porous PTFE membrane without having any influence on the porosity of the filter paper. Thus, bonding the membrane and filter paper at selected spots with a space therebetween, can be achieved as shown in FIG. 4, thereby facilitating production. Arrows are included to designate the direction of airflow. This invention also applies to filters for use in high-temperature atmospheres. This involves laying heat-resistant filter paper of glass fibers on top of expanded porous PTFE which also has high heat resistance. The efficient chemical resistance of expanded porous membrane can contribute to filtration of corrosive gases, which may be obtained by laying filter paper made of glass fibers or synthetic fibers on top of expanded porous PTFE.

However, since expanded porous PTFE which is suitable for the present invention is thin and has pores of a diameter of less than 0.1, it has been used on the air entrance side in the prior art. It has been used for filtering air which contains a large amount of dust, and therefore may clog in a short period of time. Thus, the load capacity is small and pressure loss is greatly increased in a short period of time.

Figure 1:
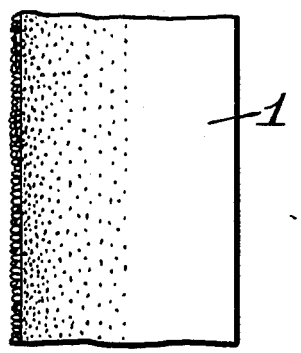
FIG. 1 is an enlarged partially sectional view of filter paper, showing the state in which dust is trapped.

Referring to FIG. 1, the filter paper (1), traps dust between the surface of the filter paper (1) and a area about ½ the depth from the entrance side, so that only a small amount of dust exits. Thus, expanded porous PTFE need only trap a smaller amount of fine particles contained in the filter paper as well as the dust which is released from the filter paper. Accordingly, when the checking member (2) is provided on the air outlet side (i.e. downstream side of filter paper (1)) as shown in FIG. 2, it is clogged to a smaller extent in comparison with the filter paper, and the clogging of the checking member (2) does not have much influence on the pressure loss. Thus, the degradation of the performance of the filter paper due to the fine particles contained therein is effectively prevented.

Since the dust generation-checking member (2) is extremely thin in order to minimize the pressure loss, it cannot per se attain the required mechanical strength. Accordingly, in superposing it onto the filter paper (1) with an adhesive, it achieves the desired strength and has the advantage of simple processing.

However, the method of superposing the dust-generation checking member onto the filter paper with an adhesive has the serious drawback in that the checking member (2) is made of a porous film with a smooth porous surface and a major portion of the pores thereof are closed by the adhesive resulting in a substantial reduction in porosity.

One method to overcome this problem is to bond the porous film to the four circumferential edges of the filter paper or to cover a frame member with the porous film and superimpose thereon the filter paper. The mechanical strength of the unsupported portions of these systems may be unsatisfactory however.

A preferred embodiment is shown in FIG. 8a-8c wherein a breathable reinforcing paper member (13) is superposed on the entire surface of a porous film (12), both of which are then bonded to each other at spots (14) as shown in FIG. 8b and further laminated onto a filter paper (11) or bonded thereto. The end result is shown in FIG. 8c. If the choice of the gas permeability of the paper member (13) and of the size of one spot or the number thereof is made based on the correlation with the desired mechanical strength, the porous film (12) can be reinforced with only a small reduction in porosity. Thus, the preferred embodiment of the present invention gives rise to a higher mechanical strength than that achieved with the embodiment in which four circumferential edge portions of the filter paper are bonded or the embodiment where the frame member is incorporated.

Where the filter paper (11) is made of synthetic fibers, an assembly prepared in a manner such that the paper member (13) is positioned between the filter paper (11) and the porous film (12) is passed between two rolls (15) and (16) as shown in FIG. 9 whereby the bonding is simultaneously effected due to the utilization of the thermoplastic properties of these three members.

In addition, where the paper member is made of glass fibers, the entire surface of the paper member (13) may be applied with a fluorocarbon resin aqueous emulsion, dried at a temperature of about 150° C. heat, treated at from about 400° to 500° C. superposed on the porous film (12), and then passed between the rolls heated at from about 400° to 500° C. to thereby effect the bonding. The resulting assembly is superposed on the downstream surface of the filter paper (11), or bonded to the surface of the filter paper and then permanently superposed in the same way as that described above.

Moreover, even when the bonding to the filter paper (11) is performed, both the surfaces of the filter paper (11) and the paper member (13) to be bonded have respectively unevennesses based on the superposition of the constituting fibers, the closing of the pores by the adhesive is less, thereby lessoning the chance of a great increase in pressure loss. An example of this embodiment is further described in Example 2.

Another embodiment is best understood by reference to FIG. 10a-10d. As shown in the perspective views, this embodiment is characterized in that a reticulated fabric member (23) is bonded to the surface of a porous film (22) as shown in FIG. 10b, followed by laminating or bonding the assembly over the filter paper (21) as shown in FIG. 10d. The porous film (22) is bonded to the reticulated fabric member (23) only in the narrow lineal portions of the mesh connected to each other. Accordingly, by the choice of the lineal diameter and the mesh size of the reticulated fabric member (23), the porous film (22) can be reinforced with only a small reduction in porosity. Thus, the present invention can give rise to a higher mechanical strength than that achieved by that made where four circumferential edge portions of filter paper are bonded or where a frame member is incorporated. Moreover, in accordance with the present invention, even when the bonding to the filter paper (21) is performed, the surface of the filter paper (21) has unevennesses based on the constituting fibers and the reticulated fabric member (23) is bonded to the lineal portions and, hence, the occurence of closing the pores by the adhesive is less, and there is no fear for a great increase in pressure loss.

In the case that the above-described assembly is permanently bonded to the filter paper, the surface of the reticulated fabric member (23) is bonded to the downstream surface of the filter paper; and where both are merely laminated, the surface of the porous film (22) may be faced toward the surface side of the filter paper (21) or the surface of the reticulated fabric member (23) may be faced at the surface side of the filter paper (21) The arrows in FIG. 10d designate the direction of airflow. This embodiment is further described in Example 3.

EXAMPLE 1

Figure 5:
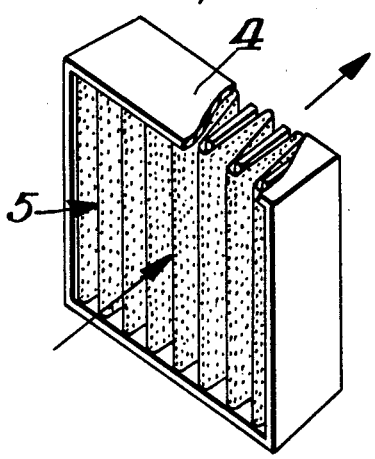
FIG. 5 is a partially sectional perspective view of a standard filter with arrows designating the direction of airflow.

High-performance filter paper having a thickness of 400 to 500 μm, pressure loss of 7 mm water-gauge pressure (with respect to the suction wind speed of 5.3 cm/sec), and a trapping efficiency of 90 to 95% (with respect to the suction wind speed of 5.3 cm/sec), was laid on top of an expanded porous PTFE film having a thickness of 7 um, pressure loss of 20 mm water-gauge pressure (with respect to the suction wind speed of 5.3 cm/sec), a trapping efficiency of 99.97% (with respect to the suction wind speed of 5.3 cm/sec), to form a high performance filter assembly to collect particles having a diameter of 0.3 μ. With reference to FIG. 5, the high-performance filter paper comprised of glass fibers or other synthetic fibers together with the expanded porous PTFE film which served as a checking member constituted filter paper assembly (5) having a surface area of 20 m². The filter assembly (5) was fixed into a frame body (4) of 610 mm in length, 610 mm in width and 150 mm depth, which is a dimension of a standard filter, in an undulating state. The frame body (4) is shown in the perspective view of FIG. 5. When this filter was tested by using air dust, the trapping efficiency of 99.995% was obtained at the wind speed of 17 m³/min. No particles which adhered to the high-performance filter paper were found to have released therefrom.

A single film of expanded porous PTFE was compared to a high-performance filter (glass fiber) in which expanded porous PTFE was overlaid with respect to the relationship between the pressure loss and the suction time for particles of 0.3 μ in diameter at the wind speed of 5.3 cm/sec. The results are shown in FIG. 6.

Figure 6:
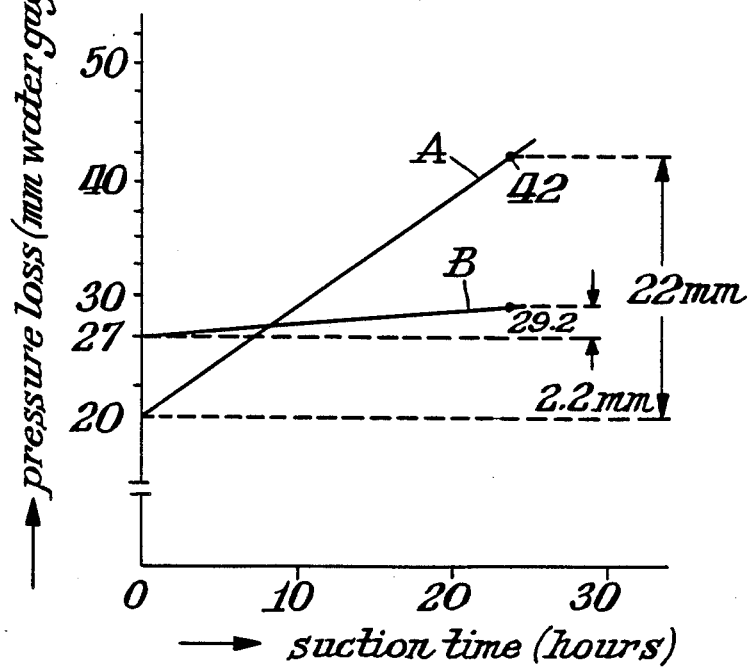
FIG. 6 shows the relationship between the pressure loss (pressure drop) and the suction time in a checking member of a porous film and the checking member overlaid with filter paper.

As can be seen from FIG. 6, in the case of single membrane of expanded porous PTFE, indicated by the curve A, the pressure loss of 20 mm water-gauge pressure at the initial stage increased to the pressure loss of 42 mm water-gauge pressure after 25-hour suction, the pressure loss increasing by 22 mm water-gauge pressure. In contrast, in the case of the membrane of expanded porous PTFE overlaid with the filter paper, indicated by the curve 8, the pressure loss of 27 mm water-gauge pressure at the initial stage increased to the pressure loss of 29.2 mm water-gauge pressure, the pressure loss increasing only by 2.2 mm water-gauge pressure., which is much less than that of the single membrane A.

Figure 7:
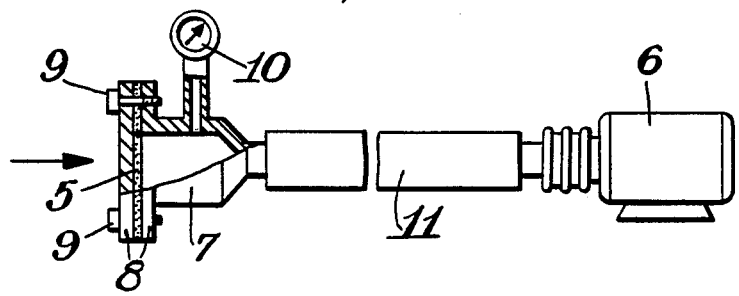
FIG. 7 shows the apparatus used for the tests on the pressure loss.

The distribution of particle diameters and the concentration of the dust for each particle size distribution used in the experiments are shown in Table 3. The apparatus shown in FIG. 7 was used for the experiments on the pressure loss. In FIG. 7, the reference numeral (6) denotes a suction pump, (7) a filter paper mounting member, (8) a clamping flange, (9) a clamping screw, (10) a pressure gauge, and (11) a connecting hose.

TABLE 3

| Particle Diameter | Concentration (number/500 cc) |
| --- | --- |
| 0.3 to 0.4 | 15,000 |
| 0.4 to 0.45 | 7,000 |
| 0.45 to 0.5 | 3,000 |

EXAMPLE 2

With reference to FIGS. 8a–8c, a paper member (13) having a basis weight of from 15 to 20 g/m² and a thickness of 0.3 mm, made from polyethylene fibers, is superposed on a polytetrafluoroethylene porous film (12) having a thickness of between 5 to 20 μm and a porosity of 95%. The assembly is then passed between rolls (15) and (16) as shown in FIG. 9 and heated from 250° to about 300° C. On the surface of either one of the rolls is provided a plurality of projections (15a) having a diameter of from about 1 to 1.5 mm, at intervals of 5 mm, so that when appropriate pressure is applied, the bonding of the assembly is performed at spots as indicated with black dots (14) as shown in FIG. 8b. The resulting assembly is further laminated on the downstream surface of the filter paper (11), or superposed and bonded such that the paper member (13) is facing the filter paper side of the filter paper (11) on which an acrylic resin aqueous emulsion has been applied. The resulting filter assembly with filter paper (13) having a basis weight of from 15 to 20 g/m² and a thickness of 0.3 mm, bonded to the fluorocarbon resin porous film with a porosity of 95%, shows only about an 8% reduction in porosity and a sufficient mechanical strength so as to resist to a generally employed blast pressure of 5.3 cm/sec. Accordingly, by laminating such a reinforced porous film with a filter paper, it is possible to obtain a high-performance filter paper which has sufficient mechanical strength and which suffers no drop in performance due to dust generation.

EXAMPLE 3

A reticulated fabric or mesh member (23), the fibers having a diameter of 0.3 mm and a mesh size of 5 mm×5 mm, which is obtainable from polyethylene fibers, is superposed on a porous film (22) as shown in FIGS. 10a–10d. The assembly is passed between rolls heated at from 250° to 300° C. while applying an appropriate pressure, whereby the bonding is effected while utilizing the thermoplasticity of the porous film (22) and the reticulated fabric member (23). The resulting assembly is further superposed on the downstream surface of the filter paper bonded such that the reticulated fabric member (23) is faced specifically towards the filter paper side of the filter paper (21) on which an acrylic resin aqueous emulsion has been applied to thereby permanently bond the two layers. Further, in this case, the reticulated fabric member (23) is made of glass fibers the entire surface of which has been applied with a fluorocarbon resin aqueous emulsion, dried at a temperature of about 150° C., heat treated at from 400° to 500° C., superposed onto a porous film (22) made of a fluorocarbon resin (PTFE). The two layers are passed between the rolls heated at from 400° to 500° C., to thereby effect the bonding. The resulting assembly is superposed onto the downstream surface of the filter paper (21) and bonded onto the surface of the filter paper (21) as shown in FIG. 10d with arrows designating the direction of airflow.

In the example, in which the reticulated member had a lineal diameter of 0.3 mm and a mesh size of 5 mm×5 mm was bonded to the fluorocarbon resin porous film (expanded PTFE) having a porosity of 95%, the reduction in porosity was nominal whereby the porosity reduced only from 10 to 15%, and a sufficient mechanical strength was imparted so as to resist about blast pressure of 5.3 cm/sec.

Since the fluorocarbon resin porous film has a high melting point, and the filter paper (21) was prepared from glass fibers which had been processed with a high temperature-resistant fluorocarbon resin or polyimide resin and the fluorocarbon resin porous film (22) was bonded thereto via the reticulated fabric member (23), it was possible to prepare a high temperature-use filter paper which can be used at about 350° C. at maximum and which is free from the dust generation.

While the invention has been disclosed herein in connection with certain embodiments and detailed descriptions; it will be clear to one skilled in the art that modifications or variations of such details can be made without deviating from the gist of the invention, and such modifications or variations are considered to be within the scope of the claims herein below.

I claim:

1. A high performance filter assembly comprising: a filter paper with inlet and outlet surfaces made of fibers and a fine particle checking member provided on the outlet surface of said filter paper so as to overlie each other, said fine particle checking member comprised of a thin microporous film and a breathable support member to which the thin microporous film is bonded at a plurality of spaced positions over its entire surface.

2. A high performance filter assembly according to claim 1, wherein the fine particle checking member is provided on the outlet surface of the filter paper with the support member facing the filter paper.

3. A high performance filter assembly according to claim 2 wherein the fine particle checking member and support member are bonded to the filter paper.

4. A high performance filter assembly according to claim 1 wherein the support member is a breathable paper member.

5. A high performance filter assembly according to claim 1 wherein the support member is a breathable reticulated fabric member.

6. A high performance filter assembly according to claim 1 wherein the fine particle checking member is expanded polytetrafluoroethylene.

7. An air filter paper assembly comprising a filter paper with air inlet and air outlet surfaces having superposed thereon a porous film to check the dust generation from said filter paper, wherein the entire surface of said porous film is spot bonded to a breathable paper membrane and then superposed on to said outlet surface of said filter paper.

8. An air filter paper filter paper assembly according to claim 7 wherein the entire surface of said porous film is spot bonded to a breathable reticulated fabric member and then superposed on to said outlet surface of said filter paper.

9. An air filter paper assembly according to claim 7 wherein the porous film is expanded polytetrafluoroethylene.

* * * * *